W. S. Stetson,
Harvester Rake.

No. 30167    Patented Sep. 25 1860.

2 Sheets. Sheet 1.

W. S. Stetson,
Harvester Rake.

2 Sheets. Sheet 2.

No. 30,167

Patented. Sep. 25. 1860

UNITED STATES PATENT OFFICE.

W. S. STETSON, OF BALTIMORE, MARYLAND.

IMPROVEMENT IN IMPLEMENTS FOR REAPING-MACHINES.

Specification forming part of Letters Patent No. 30,167, dated September 25, 1860.

*To all whom it may concern:*

Be it known that I, W. S. STETSON, of Baltimore, in the county of Baltimore and State of Maryland, have invented an improved implement for reaping-machines, consisting of a rake and fork combined; and I do hereby declare that the following is a full, clear, and exact description of the principle or character which distinguishes it from all other things before known, and of the usual manner of making, modifying, and using the same, reference being had to the accompanying drawings, of which—

Figure 1:
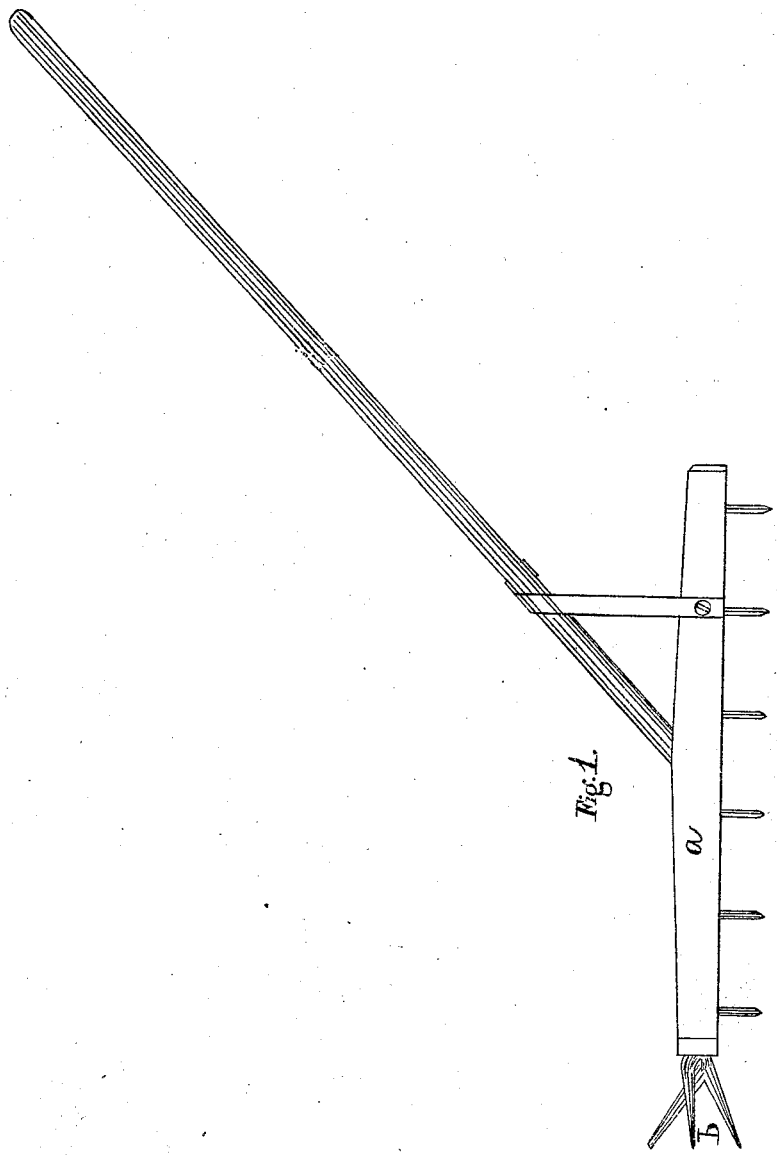
Figure 2:

Figure 1 is a perspective view of the implement, and Fig. 2 a detached view of the fork.

Figure 3:
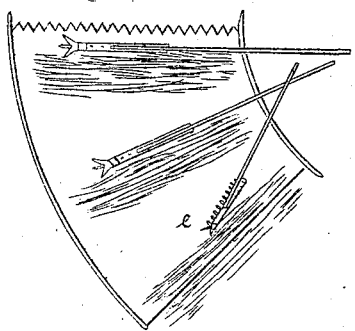

My invention consists in a new implement, combining a rake and fork, for use in connection with reaping-machines, described and represented as follows:

One end of the rake $a$ is provided with a fork, $b$, constructed substantially as shown in the drawings, although the exact number, form, and arrangement of the tines are not essential, so that they may be used as follows:

The raker carries the gavel rearward on the platform by the usual movement of the rake, and then, instead of passing it over the side of the platform by the continued use of the rake-teeth, the fork on the end of the rake is used to pitch the gavel off. This is effected by bringing the rake and fork into the position shown at $e$, Fig. 3.

What I claim, and desire to secure by Letters Patent, is—

The improved implement for harvesters, the same consisting of the combination of a rake and fork, substantially in the manner and for the purposes herein set forth.

W. S. STETSON.

Witnesses:
   D. KNOX,
   J. DAMAR.